ORTHOGONAL WRITE SYSTEM FOR MAGNETIC MEMORIES

Filed March 27, 1961

INVENTORS
ROBERT M. MACINTYRE,
CRAVENS L. WANLASS
BY THEIR ATTORNEYS
HARRIS, KIECH, RUSSELL & KERN

United States Patent Office 3,189,879
Patented June 15, 1965

3,189,879

ORTHOGONAL WRITE SYSTEM FOR MAGNETIC MEMORIES

Robert M. MacIntyre, Newport Beach, and Cravens L. Wanlass, Santa Ana, Calif., assignors, by mesne assignments, to Raytheon Company, a corporation of Delaware Filed Mar. 27, 1961, Ser. No. 98,496
11 Claims. (Cl. 340—174)

This invention relates to a writing system for a magnetic memory and, in particular, to a coincident current writing system particularly adapted for use in memory arrays or matrices.

Memory elements utilizing magnetic toroid cores and pieces of magnetic material with orthogonal intersecting flux paths and orthogonal current axes have been used in magnetic memories. Information has been written into such memory elements in various ways, including a single large current, coincident currents on parallel conductors, and linear select operation on parallel conductors. These methods suffer from various disadvantages. The single current writing system requires a relatively high driving current and cannot be used for selection in an array. The coincident current system utilizing two currents coinciding in time along a current axis is ideal for selection in an array but requires magnetic material with an extremely square hysteresis characteristic. The linear select method is suitable for selection in an array wherein the characteristic of the magnetic material of the elements is not ideal, but is much more expensive and complicated for large memories than the coincident current system. Therefore it is an object of the present invention to provide a write system for magnetic memories which can utilize coincident current selection with relatively low magnitude currents and with conventional magnetic materials of only relatively square hysteresis characteristics. A further object is to provide such a system which may be used with various conventional readout systems. A particular object is to provide such a writing system which may be used in conjunction with a nondestructive reading system and one which may have very fast access or reading time.

In general, the invention contemplates a matrix of magnetic memory elements which are wired to provide $x$–$y$ selection of individual elements for writing information into the array and similar $x$–$y$ selection for reading information from particular elements. The matrix may be word oriented to write a complete word into the array at one time and to read out a complete word at one time. Each element comprises a piece of magnetic material having first and second current axes therethrough perpendicular to each other with a flux zone therebetween, a first flux path about the first axis, and a second flux path about the second axis intersecting and perpendicular to the first flux path in the flux zone. Normally, the current axes will comprise conductors threaded through openings in the magnetic material, with the orthogonal openings separated by a portion of the magnetic material to provide the flux zone for interesection of the flux paths.

It has been found that information can be written into such an element, i.e, the remanent flux state about one flux path can be set to a particular polarity, by a current along the axis of the path (the storage axis) and a coincident pulsating current along the axis of the other flux path (the strobe axis) with neither of the currents being of a magnitude to produce any significant flux switching around the storage axis by itself.

Accordingly, it is an object of the invention to provide a magnetic memory element including a piece of magnetic material having first and second intersecting orthogonal flux paths, first means for generating a M.M.F. about the axis of the first path to write information into the element with the polarity of the resulting flux being a function of the information to be stored, second means for generating a pulsating flux about the axis of the second path with the flux coinciding with and pulsating a plurality of times during the flux of the first means, strobe means for generating a flux pulse about the second axis for reading stored information from the element, and output means for determining flux changes occurring about the first axis during operation of the strobe means. A specific object is to provide such a memory element in which the magnitude of the M.M.F. generated by the first means is less than that capable of switching the polarity of the remanent flux in the first path and in which the second means generates a pulsating bipolar flux about the second axis.

It is an object of the invention to provide a method of writing into magnetic memories including elements having first and second orthogonal intersecting magnetic flux paths by generating a first flux pulse in the first path with the polarity of the first pulse being a function of the information to be stored, and simultaneously generating a second flux in the second path with the second flux pulsating a plurality of times during the duration of the first pulse. A further object is to provide such a method including generating a M.M.F. pulse in the first path of a magnitude less than that capable of switching the polarity of the remanent flux in the first path, and simultaneously generating an oscillating bipolar flux in the second path with the flux oscillating a plurality of times during the duration of the M.M.F. pulse.

It is an object of the invention to provide a method of coincident current selection for writing information into a selected element of a magnetic memory matrix including the steps of generating a first pulse of current along the first axis of the elements of a row of the matrix with the polarity of the first current being a function of the information to be stored, and simultaneously generating a second oscillating bipolar current along the second axis of the elements of a column, with the writing occurring in the particular element having the two currents thereat coincidentally. A further object is to provide such a method for writing a word into a matrix including generating a pulse of current along the first axis of all the elements of each row of the matrix at the same time, and selecting a particular word for writing by simultaneously generating an oscillating bipolar current along the second axis of the elements of a particular column.

It is a further object of the invention to provide such an orthogonal pulsating writing system which can be used for integration of a variable.

Other objects, advantages, features and results of the invention will more fully appear in the course of the following description. The drawing merely shows and the description merely describes preferred embodiments of the present invention which are given by way of illustration or example.

Figures 1, 2, 3:
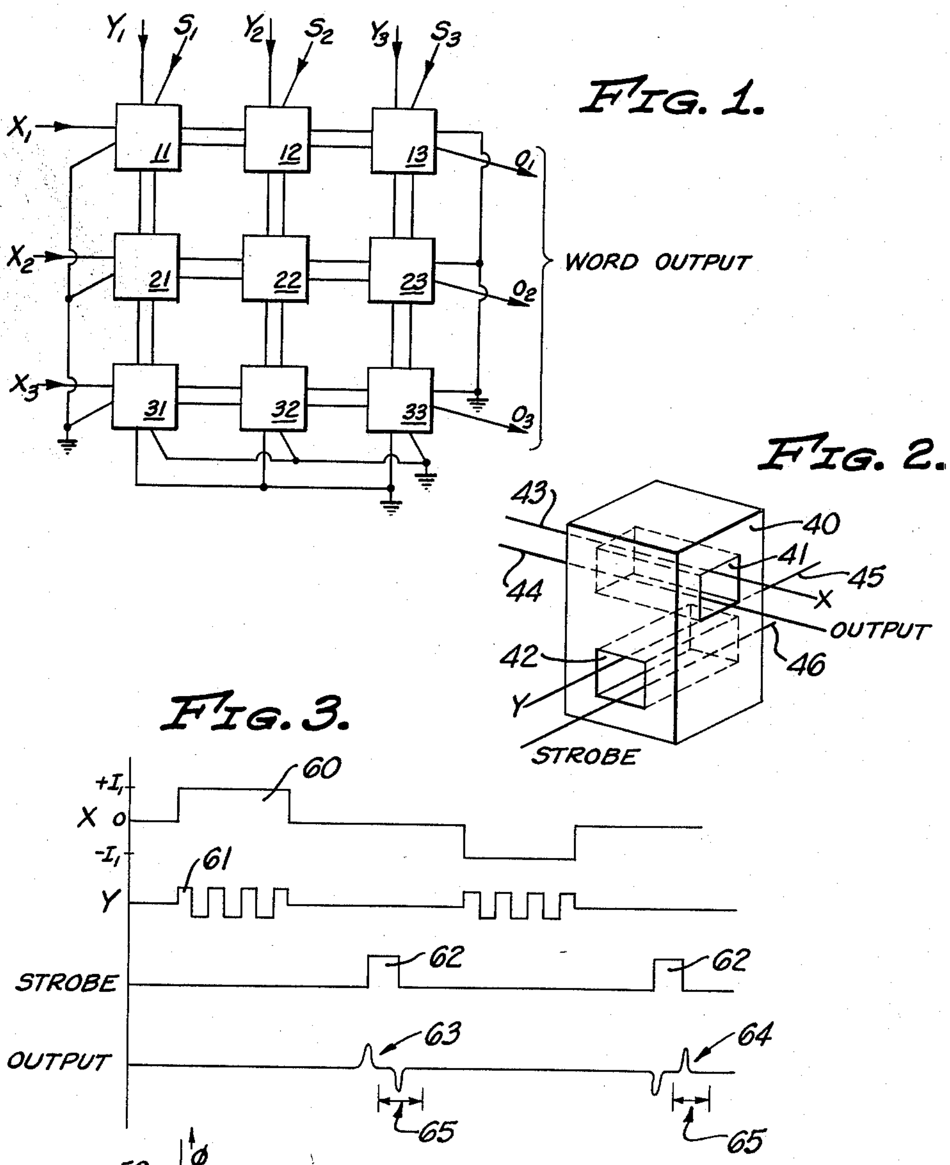
FIG. 1 is a diagram of a matrix of memory elements.
FIG. 2 shows one of the elements of FIG. 1.
FIG. 3 is a graph illustrating the operation of a magnetic element.

FIG. 1 illustrates a martix of magnetic memory elements arranged in horizontal rows and vertical columns. A typical magnetic element is shown in FIG. 2 and comprises a piece 40 of magnetic material having openings 41, 42 therethrough. The particular magnetic material utilized is not significant, it only being necessary that the material have two stable states of magnetic remanence.

Figure 4:
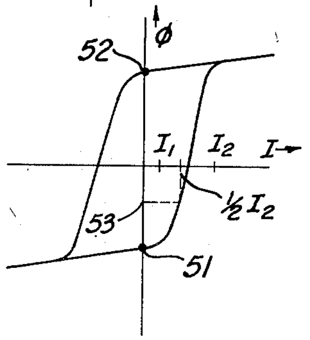
FIG. 4 is a typical hysteresis loop of one of the magnetic elements.

Various ferrites are presently being used and a typical hysteresis curve is shown in FIG. 4.

The opening 41 provides a current axis for an $x$ write conductor 43 and an output conductor 44. Similarly, the opening 42 provides a current axis for a $y$ write conductor 45 and a strobe or interrogate conductor 46. A magnetic flux path exists about the opening 41 and another magnetic flux path exists about the opening 42. These two flux paths intersect in the area between the two openings and are orthogonal to each other.

In the matrix of FIG. 1, a write conductor $X_1$ threaded through the opening 41 of each of the elements 11, 12, 13. Similar write conductors $X_2$ and $X_3$ are threaded through the opening 41 of elements 21, 22, 23 and 31, 32, 33, respectively. Output conductors $O_1$, $O_2$, $O_3$ parallel the write conductors $X_1$, $X_2$, $X_3$, respectively. A write conductor $Y_1$ and a strobe or interrogate conductor $S_1$ are threaded through the openings 42 of each of the elements 11, 21, 31. Similarly, write conductor $Y_2$ and strobe conductor $S_2$, and write conductor $Y_3$ and strobe conductor $S_3$ are threaded through the openings 42 of the elements 12, 22, 32 and 13, 23, 33, respectively. All of the conductors are shown as single turn windings in the embodiment of FIG. 1, and separate conductors are provided in an opening for writing and reading. Multiturn windings could be used where desired. Also, only a single conductor in an opening is necessary, with appropriate switching being provided externally of the matrix.

The writing system of the invention will be explained in conjunction with FIGS. 3 and 4, wherein FIG. 4 illustrates the flux conditions about the output opening 41. Point 51 represents one remanent flux state for the magnetic material and point 52 represents the other remanent flux state. Information is written into the element by switching the magnetic material about the opening 41 to one or the other of the states 51, 52. This is accomplished in the system of the invention by providing a current pulse 60 on the $x$ write conductor and a series of current pulses 61 on the $y$ write conductor, with the $y$ series of pulses occurring during the $x$ pulse. The polarity of the remanent state and, hence, the sense of the information stored, is a function of the polarity of the $x$ current pulse. Information is read out of the element by applying a current pulse 62 to the strobe conductor which produces a temporary flux change about the output conductor as indicated at 63 and 64 of FIG. 3. The polarity of the voltage induced on the output conductor is a function of the polarity of the remanent flux about the output conductor and is independent of the polarity of the strobe pulse 62. Ordinarily, the amplifier driven by the output conductor is gated on only during the periods 65 to provide a single output pulse for each strobe pulse with the polarity of the output pulse representing the sense of the stored information. This strobing system provides for nondestructive reading so that the stored information may be read any number of times without requiring rewriting after each reading operation.

Referring to FIG. 4 and assuming that the magnetic material about the output opening is in the remanent state 51, it is noted that a current of magnitude $I_2$ is required in the $x$ write conductor to switch the material to the other remanent state 52. In the conventional coincident current writing system, this may be accomplished by providing two conductors through the output opening with each having a current pulse of a magnitude equal to one half of $I_2$. However this coincident current selection system can be used only with magnetic materials having a squareness ratio considerably greater than that of FIG. 4. A half-select current, one-half $I_2$, applied to a nonselected element would produce considerable disturbance in the element and cause a reduction in the remanent flux to the point 53. This would be an undesirable condition in a matrix and also would require considerable driving power, since all of the elements on the write conductor would undergo some switching.

In the present invention, a relatively small current pulse is provided on the $x$ write conductor and a pulsating current is applied on the $y$ write conductor, with the $x$ and $y$ conductors disposed orthogonal to each other. For example, the magnitude of the $x$ write current may be $I_1$ as shown in FIG. 4, which by itself produces substantially no change in the remanent flux condition. However, the coincident existence of the current $I_1$ through the opening 41 and the pulsating current through the opening 42 results in remanent flux switching from point 51 to point 52. The switching is incremental in nature with ordinarily five to twenty pulses being required to produce a change from the state 51 to 52 or from 52 to 51. The only requirement on the pulsating current is that it be of a magnitude to produce flux switching about the opening 42 (the strobe axis).

In a typical operation, a word may be written into a column of elements of the matrix of FIG. 1 by applying current pulses of appropriate polarity to each of the $x$ write conductors and applying a pulsating current to the $y$ write conductor of the particular column in which the word is to be written. Then all of the elements of the selected column will be set to the desired remanent state at one time while the elements of the other columns will not be affected. Subsequently, the word can be read by generating a strobe current pulse on the strobe conductor of the selected column and noting the voltages induced on each of the output conductors.

Similarly, information can be read into a single element by applying a current pulse of appropriate polarity to the particular $x$ write conductor passing therethrough and simultaneously applying the pulsating current to the $y$ write conductor passing therethrough. The information is read from this selected element by applying a strobe pulse to the strobe conductor thereof and noting the voltage induced on the output conductor.

The driving currents for the writing and reading operations may be produced in the conventional manner by flip-flops or gated amplifiers. The bipolar flux produced about the $y$ write conductor may be produced by a bipolar oscillating current or by utilizing two conductors with a D.C. current on one and a unipolar oscillating current on the other.

The coincident current writing system of the invention permits use of the magnetic memory element as an integrator. Ordinarily, the memory elements are used in a digital manner with only the polarity of the output pulses being of significance. However, the magnitude of the output pulse is a function of the magnitude of the remanent flux which, in turn, is a function of the number of pulses provided on the $y$ write conductor, up to a limit which produces saturation and the remanent states 51 or 52. Hence, the memory element may be used as an integrator by relating the number of pulses applied to the $y$ write conductor to the variable which is to be integrated. Then the magnitude of the pulse produced on the output conductor will represent the integral of the variable.

The orthogonal writing system of the present invention provides for coincident current writing in magnetic materials, such as ferrite materials having relatively nonsquare characteristics. The system also permits writing with relatively low currents compared to that required for complete flux switching in the material.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. A method of writing information into a magnetic memory element which has first and second magnetic flux paths therein with the paths intersecting orthogonally in a zone, by switching the polarity of the remanent flux in the first path, including the steps of:

generating a first flux pulse in said first path with the polarity of the first pulse being a function of the information to be stored;

and simultaneously generating a second flux in said second path, with said second flux pulsating a plurality of times during the duration of said first pulse.

2. A method of writing information into a magnetic memory element which has first and second magnetic flux paths therein with the paths intersecting orthogonally in a zone, by switching the polarity of the remanent flux in the first path, including the steps of:

generating an M.M.F. pulse in said first path of a magnitude less than that capable of switching the polarity of the remanent flux in the first path, with the polarity of the M.M.F. pulse being a function of the information to be stored;

and simultaneously generating an oscillating bipolar flux in said second path, with said flux oscillating a plurality of times during the duration of said M.M.F. pulse.

3. A method of writing information into a magnetic memory element which has first and second current axes therethrough perpendicular to each other with a flux zone therebetween, a first flux path about the first axis, and a second flux path about the second axis intersecting and perpendicular to the first flux path in the flux zone, including the steps of:

generating a first pulse of current along said first axis to produce an M.M.F. in said first path of a magnitude less than that capable of switching the polarity of the remanent flux in the first path, with the polarity of the first current being a function of the information to be stored;

and simultaneously generating a second oscillating bipolar current along said second axis to produce a flux in said second path, with said second current oscillating a plurality of times during the duration of said first current, and with each of the oscillations providing incremental remanent flux switching in said first path.

4. A method of coincident current selection for writing information into a selected magnetic memory element of a matrix of rows and columns of elements, where each element has first and second current axes therethrough perpendicular to each other with a flux zone therebetween, a first flux path about the first axis, and a second flux path about the second axis intersecting and perpendicular to the first flux path in the flux zone, including the steps of:

generating a first pulse of current along the first axis of the elements of a row to produce an M.M.F. along the first path of each of such elements of a magnitude less than that capable of switching the polarity of the remanent flux in the first path, with the polarity of the first current being a function of the information to be stored;

and simultaneously generating a second oscillating bipolar current along the second axis of the elements of a column to produce a flux along the second path of each of such elements, with said second current oscillating a plurality of times during the duration of said first current, and with the writing occurring in the particular element haivng the two currents thereat coincidentally.

5. A method of writing a word into a matrix of rows and columns of magnetic memory elements, with each column representing a word, where each of the elements has first and second current axes therethrough perpendicular to each other with a flux zone therebetween, a first flux path about the first axis, and a second flux path about the second axis intersecting and perpendicular to the first flux path in the flux zone, including the steps of:

generating a pulse of current along the first axis of all the elements of each row at the same time to produce an M.M.F. in the first path of each such element of a magnitude less than that capable of switching the polarity of the remanent flux in the first path, with the polarity of the current in each row corresponding to a bit of the word to be stored;

and simultaneously generating an oscillating bipolar current along the second axis of the elements of the column in which the word is to be written to produce a flux along the second path of each of such elements, with the current in the selected column oscillating a plurality of times during the duration of the pulse of currents in the rows.

6. A method of writing information into a magnetic element which has first and second magnetic flux paths therein with the paths intersecting orthogonally in a zone, by varying the remanent flux in the first path such that the output on strobing represents the integral of a variable, including the steps of:

generating an M.M.F. pulse in said first path of a magnitude less than that capable of switching the polarity of the remanent flux in the first path and of a polarity to produce switching of the remanent flux;

generating a series of bipolar flux pulses in said second path during the duration of said M.M.F. pulse, with the number of pulses in the second path being a function of the variable to be integrated;

then generating a flux pulse in said second path to strobe the element;

and determining the mangitude of flux change occurring in said first path during said strobe pulse.

7. In a magnetic memory element, the combination of:

a piece of magnetic material having first and second current axes therethrough perpendicular to each other with a flux zone therebetween, a first flux path about said first axis, and a second flux path about said second axis intersecting and perpendicular to said first flux path in said flux zone;

first means for generating a flux about said first axis to write information into the element, with the polarity of the flux being a function of the information to be stored;

second means for generating a pulsating flux about said second axis, with the flux coinciding with and pulsating a plurality of times during the flux of said first means;

strobe means for generating a flux pulse about said second axis for reading stored information from the element;

and output means for determining flux changes occurring about said first axis during operation of said strobe means.

8. In a magnetic memory element, the combination of:

a piece of magnetic material having first and second current axes therethrough perpendicular to each other with a flux zone therebetween, a first flux path about said first axis, and a second flux path about said second axis intersecting and perpendicular to said first flux path in said flux zone;

first means for generating an M.M.F. about said first axis to write information in the element, with the magnitude of the M.M.F. less than that capable of switching the polarity of the remanent flux in the first path, and with the polarity of the M.M.F. being a function of the information to be stored;

second means for generating a pulsating bipolar flux about said second axis, with the flux coinciding with and pulsating a plurality of times during the M.M.F. of said first means;

strobe means for generating a flux pulse about said second axis for reading stored information from the element;

and output means for determining flux changes occurring about said first axis during operation of said strobe means, with the polarity of such flux changes being a function only of the polarity of the preceding first means flux and independent of the polarity of the strobe means pulse.

9. In a magnetic memory element, the combination of:

a piece of magnetic material having first and second openings therethrough perpendicular to each other with a flux zone therebetween, a first flux path about said first opening, and a second flux path about said second opening intersecting and perpendicular to said first flux path in said flux zone;

first means for generating a first pulse of current in said first opening to produce a flux in said first path to write information into the element, with the magnitude of the current less than that capable of switching the polarity of the remanent flux in the first path, and with the polarity of the current being a function of the information to be stored;

second means for generating a second oscillating bipolar current in said second opening to produce a flux in said second path, with the second current coinciding with and oscillating a plurality of times during the duration of the first current;

strobe means for generating a strobe current pulse in said second opening to produce a flux in said second path for reading stored information from the element;

and output means for determining flux changes occurring in said first path during said strobe current pulse, with the polarity of such flux changes being a function only of the polarity of the preceding first current and independent of the polarity of the strobe current.

10. In a magnetic memory, the combination of:

a matrix of magnetic memory elements arranged in rows and columns, with each of said elements comprising a piece of magnetic material having first and second current axes therethrough perpendicular to each other with a flux zone therebetween, a first flux path about said first axis, and a second flux path about said second axis intersecting and perpendicular to said first flux path in said flux zone;

first means for generating an M.M.F. about the first axis of the elements of a row, with the magnitude of the M.M.F. less than that capable of switching the polarity of the remanent flux in the first path, and with the polarity of the M.M.F. being a function of the information to be stored;

second means for generating a pulsating bipolar flux about the second axis of the elements of a column, with the flux coinciding with and pulsating a plurality of time during the M.M.F. of said first means, and with information storage occurring in the particular element having the two fluxes thereat simultaneously;

strobe means for generating a flux pulse about the second axis of the elements of said column for reading stored information from the elements of the column;

and output means for determining flux changes occurring about said first axis of each of the elements of said column during operation of said strobe means, with the polarity of such flux changes being a function only of the polarity of the preceding first means flux and independent of the polarity of the strobe means pulse.

11. In a word oriented magnetic memory, the combination of:

a matrix of magnetic memory elements arranged in rows and columns, with each of said elements comprising a piece of magnetic material having first and second current axes therethrough perpendicular to each other with a flux zone therebetween, a first flux path about said first axis, and a second flux path about said second axis intersecting and perpendicular to said first flux path in said flux zone, and with each column of elements representing a word;

first means for generating an M.M.F. about the first axis of the elements of each row at the same time, with the magnitude of the M.M.F. less than that capable of switching the polarity of the remanent flux in the first path, and with the polarity of the M.M.F. in each row corresponding to a bit of the word to be stored;

second means for generating a pulsating bipolar flux about the second axis of the elements of the column in which the word is to be written, with the flux coinciding with and pulsating a plurality of times during the M.M.F. of said first means;

strobe means for generating a flux pulse about the second axis of the elements of said column for reading the word from the elements of the column;

and output means for determining flux changes occurring about said first axis of each of the elements of said column during operation of said strobe means, with the polarity of such flux changes being a function only of the polarity of the preceding first means flux and independent of the polarity of the strobe means pulse.

References Cited by the Examiner

Publication I: IRE Wescon Convention Record, "Biax High Speed Magnetic Computer Element," by C. L. Wanlass and S. D. Wanlass, vol. 3, part 4, pp. 40–54, August 31, 1959.

IRVING L. SRAGOW, *Primary Examiner.*

JOHN F. BURNS, *Examiner.*